(12) United States Patent
Khairallah

(10) Patent No.: US 11,602,837 B2
(45) Date of Patent: Mar. 14, 2023

(54) MODULAR ROBOTIC STRUCTURE

(71) Applicant: ROBOTICS DESIGN INC., Montréal (CA)

(72) Inventor: Charles Khairallah, Verdun (CA)

(73) Assignee: ROBOTICS DESIGN INC., Montreal (CA)

( * ) Notice: Subject to any disclaimer, the term of this patent is extended or adjusted under 35 U.S.C. 154(b) by 295 days.

(21) Appl. No.: 16/758,169

(22) PCT Filed: Oct. 23, 2018

(86) PCT No.: PCT/CA2018/051338
§ 371 (c)(1),
(2) Date: Apr. 22, 2020

(87) PCT Pub. No.: WO2019/079889
PCT Pub. Date: May 2, 2019

(65) Prior Publication Data
US 2020/0306954 A1    Oct. 1, 2020

Related U.S. Application Data

(60) Provisional application No. 62/575,602, filed on Oct. 23, 2017.

(51) Int. Cl.
*B25J 9/08* (2006.01)
*B25J 9/10* (2006.01)
*B25J 9/12* (2006.01)
*F16H 19/06* (2006.01)
*F16H 25/20* (2006.01)

(52) U.S. Cl.
CPC .............. *B25J 9/08* (2013.01); *B25J 9/102* (2013.01); *B25J 9/104* (2013.01); *B25J 9/12* (2013.01); *F16H 19/06* (2013.01); *F16H 25/20* (2013.01); *F16H 2019/0681* (2013.01); *F16H 2019/0695* (2013.01)

(58) Field of Classification Search
CPC ..... B25J 9/08; B25J 9/102; B25J 9/104; B25J 9/12; F16H 19/06; F16H 25/20; F16H 2019/0681; F16H 2019/0695
See application file for complete search history.

(56) References Cited

U.S. PATENT DOCUMENTS 9,610,686 B2 *   4/2017   Song ........................ B25J 9/08

FOREIGN PATENT DOCUMENTS

WO    WO2016185512 A1    11/2016

* cited by examiner

*Primary Examiner* — Randell J Krug
(74) *Attorney, Agent, or Firm* — Norton Rose Fulbright Canada LLP

(57) ABSTRACT

A motorized module for a modular robotic structure comprises a housing, a first wheel, a second wheel, an elongated structure mounted to the first and second wheels and configured to rotate the first and second wheels. A driver is mounted to the housing between the first and second wheels. A leadscrew is mounted to the housing between the first and second wheels. A transmission drivingly connecting the driver to the leadscrew. A connector is coupled to the leadscrew and configured to move longitudinally along the second longitudinal axis in response to a rotation of the leadscrew, the connector being attached to the elongated structure.

15 Claims, 18 Drawing Sheets

MODULAR ROBOTIC STRUCTURE

TECHNICAL FIELD

The present application relates to modular articulated mechanisms, and more particularly, to modular robotic structures or robot articulated limbs.

BACKGROUND OF THE ART

It is generally known to have robot systems which are modular, reconfigurable and expandable to thus improve the flexibility and versatility thereof. For example, a manipulator arm of the robot system may be formed of a number of independent rotary modules releasably connected to each other. The manipulator arm may be disassembled and reassembled in order to obtain different arm configurations. A motor having a drive shaft may drive one module relative to another for pivoting the modules relative to each other.

Automation is becoming increasingly desirable in robotic design. However, existing robotic architectures have some drawbacks and limitations in terms of implementation, versatility, structural strength, flexibility, compactness and adaptability just to name a few. For example, the torque may require a large motor. Furthermore, the manipulator arm may occupy a large volume when the modules are folded and the motors installed. Accordingly, there is room for improvement.

SUMMARY

In one aspect, there is provided a motorized module for a modular robotic structure comprising a housing; a first wheel mounted to the housing and having a first axis of rotation; a second wheel mounted to the housing and having a second axis of rotation; an elongated structure mounted to the first and second wheels and configured to rotate the first and second wheels; a driver mounted to the housing between the first and second wheels, the driver having a rotatable pin extending along a first longitudinal axis, the rotatable pin rotating about the first longitudinal axis; a leadscrew mounted to the housing between the first and second wheels, the leadscrew extending along a second longitudinal axis, the leadscrew rotating about the second longitudinal axis; a transmission drivingly connecting the driver to the leadscrew; and a connector coupled to the leadscrew and configured to move longitudinally along the second longitudinal axis in response to a rotation of the leadscrew, the connector being attached to the elongated structure.

In another aspect, there is provided a manipulator arm for a modular robotic structure comprising a base module having a first shaft and a second shaft extending therefrom, the first and second shafts extending in opposite directions; a first module coupled to the base module and configured to rotate relative to the base module, the first module including a first pair of interconnected wheels and a second pair of interconnected wheels, the first pair of interconnected wheels having a first wheel drivingly engaged with the first shaft and a second wheel, the second pair of interconnected wheels having a third wheel idly engaged with the second shaft and a fourth wheel; and a second module coupled to the first module and configure to rotate relative to the first module, the second module being drivingly engaged with the fourth wheel.

In another aspect, there is provided a manipulator arm for a modular robotic structure comprising a first module having a first compartment defined therein between two spaced-apart longitudinal first arm elements, the first arm elements defining a boundary of the first module; a second module coupled to the first module and configured to rotate relative to the first module, the second module configured to be inserted in the first compartment.

In another aspect, there is provided a motorized module for a modular robotic structure comprising a housing; at least one wheel mounted to the housing; an elongated structure mounted to the at least one wheel configured to rotate the at least one wheel; and a driver drivingly connected to the elongated structure and configured to move longitudinally along a first path.

In another aspect, there is provided a system to allow a motorized module to be connected to a non-motorized module in order to form an articulated link. This link could be assembled in order to form a mobile robot or an articulated modular limb.

In another aspect, there is provided a system to allow converting existed modular articulated limb to become motorized limb by simply connecting a new motorized module in one or both sides of the limb. This operation could be realized by providing an appropriate shaft in order to turn a second module relative to a first module.

In accordance with a further aspect, a motorized module may comprise an actuator, a control system; sensor and communication system integrated therein. The module may further have a battery or another source of power in order to move the second module relative to the first module.

The present disclosure allows, among others, designing a mobile robot for Explosive Ordnance Disposal (EOD), mining and for construction.

Also the present disclosure allows designing an articulated arm used for EOD mining and construction.

In accordance with another aspect, there is provided a new lightweight frame design having a novel modular architecture that can be adaptable to many applications and shape.

In accordance with another aspect, there is provided a modular articulation in order to attach many robots together in a serial mode.

In accordance with another aspect, this robot could be a tele-operating or autonomous robot using integrated batteries or the like.

In accordance with one possible applications, the robotic modular architecture could be configured for used with drones. The drone has a body including a light weight sandwich panel having a top and a bottom layer carrying solar cells. A pneumatic ring or other buoyant structures could be integrated to the drone structure in order to allow the drone to float on water. Also, a bumper, e.g. the pneumatic ring, could be provided on the drone structure to protect it against collision accident and to use it for emergency landing. A mechanism of compressed air can be provided to further inflate the ring and be used when necessary such as in landing or emergency situations.

According to a further aspect, the drone comprises a plurality of modular propulsion cylinders (for instance 3 to 12 propulsion cylinders per drone according to one implementation), each modular propulsion cylinder having its own controller and a propeller on at least one side. Such propulsion cylinder could be inserted into the body of a drone (plug and play) electrical connectors. Each propulsion cylinder can have a controller and a battery. The number of activated propulsion cylinder is determined by an algorithm in order to distribute the force and the optimization of the power need for a given task.

According to a still further aspect, a modular articulated robotic limb is mounted to a drone in order to manipulate object or to allows for in-flight capturing of a second drone. The limb may be provided in the form of an arm of a drone to pick an object and place the object in a basket carried by the drone.

In a further aspect, the drone is formed by a light weight sandwich panel. Formed by a central body and 2 disk on each side. The central bodies construct from fiber carbon and plastic that could be manufactured with a 3D printer. This body has a plurality of cylinders (e.g. a dozen) and a compartments for battery, control system, navigation, camera and sensor. Electrical connectors are provided for each cylinder. The disk is attached by the screws and covered by a solar panel It is also contemplated to connect an extra engine on the top of the drone using a bracket, thereby allowing the drone to be used as a hydro-craft.

The ability to control the number and the sequence of the engine provides an advantage on the "fly capacity" in order to rotate the drone in three degrees of freedom (i.e. X, Y, Z).

It is also contemplated to provide different shape for the pneumatic ring in order to provide for a planer drone using a pneumatic wing having an aerodynamic shape.

In another aspect, a manual (none powered) articulated arm module is allowed to be converted into a motorized arm module by the addition of an independent module. This independent module uses a linear motor connected via a belt or chain in order to allow the manual rotation to be transformed to automated rotation. A manual articulated arm can thus be readily converted into an automated arm by mounting a motorized module on one side of a link of the articulated arm. The motorized module uses a linear mechanism attached to a timing belt. The linear mechanism uses leadscrew or ACME screw that provides motion precision to the rotation module with fewer backlashes. Also it allows the rotation to be rigid or flexible depending on the leadscrew. The ACME screw allows automatically lock the system against when the actuator or motor is shut down. This is specially advantageous if the module turn in X orientation like an elephant trump.

DESCRIPTION OF THE DRAWINGS

Reference is now made to the accompanying figures in which.

DETAILED DESCRIPTION

Figure 1A:
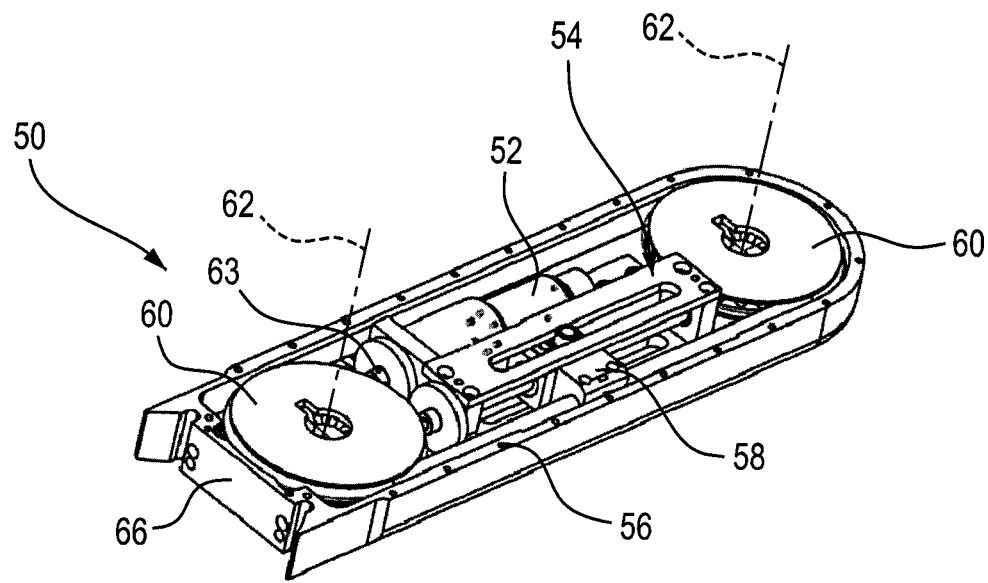
FIG. 1A illustrates a motorized module including a rotary motor driving a leadscrew in order to rotate pulleys using a timing belt or chain.

FIG. 1A illustrates a motorized module 50 for a modular robotic structure. For example, the motorized module 50 may be used to rotate rotary modules of a robot. The motorized module 50 may include a housing 66 for housing a driver 52 (e.g. a rotary motor) drivingly coupled to a linear screw mechanism, or a leadscrew 54, to convert rotational motion from the driver 52 into a linear motion. As used herein, the term "coupled" is used in its broadest sense to refer to elements which are connected, attached, and/or engaged, either directly or integrally or indirectly via other elements, and either permanently, temporarily, or removably.

As used herein, the term "drivingly" (e.g., "drivingly engaged" or "drivingly coupled") describes a communicative relationship between components, for example where an output force from either a first component or a second component is directly or indirectly communicated to the other of the first component or the second component. For example, the term "drivingly engaged" is intended to include any engagement allowing two components to rotate together, at the same speed or at different speeds, and in the same direction or in different directions, including, but not limited to, direct connections, direct meshed engagement, engagement through meshing with one or more intermediate meshed element(s) (gear, pinion, etc.) and engagement through intermediate elements, e.g. idler gear.

The driver 52 may be any one of an electric, a pneumatic, and a hydraulic motor. The driver 52 may also be mechanically manipulated by a user. The driver 52 may have a rotatable pin 63 that extends along a first longitudinal axis, whereas the rotatable pin 63 may rotate about the first longitudinal axis. The leadscrew 54 extends along a second longitudinal axis, whereas the leadscrew 54 may rotate about the second longitudinal axis. The first and second longitudinal axes may be coplanar, that is, the axes extend in the same plane. In some embodiments, the coplanar and/or parallel axes may provide a compact design. For example, the compact design may refer to a design that has a width close to a width of the wheels. The first and second longitudinal axes may be parallel. The leadscrew 54 may include ACME threads. A transmission may be provided between the driver 52 and the leadscrew 54 to drivingly connect the driver 52 to the leadscrew 54. In other words, the transmission may transfer the rotation of the driver 52 to rotate the leadscrew 54. The transmission may include a set of gears.

In the embodiment shown in FIG. 1A, the leadscrew 54 is attached to an elongated structure 56, such as a timing belt, a belt, a cam and follower, and the like, via a connector 58. Thus, the structure 56 may be flexible such as a belt or a chain, or rigid such as a cam. As such, the connector 58 is attached to the structure 56. The connector 58 is intended to refer to any suitable attachment to attach the leadscrew 54 and the structure 56 together. For example, the connector 58 may be coupled to the leadscrew 54 and configured to move longitudinally along the second longitudinal axis in response to a rotation of the leadscrew 54. Thus, turning the leadscrew 54 may consequently translate or move the structure 56 via the connector 58.

The motorized module 50 includes may include one or more wheels 60. For example, in the embodiment shown in FIG. 1A, the motorized module 50 includes a first wheel 60 mounted to the housing 66 and having a first axis of rotation 62, and a second wheel 60 mounted to the housing 66 and having a second axis of rotation 62. The first and second axes of rotation may be parallel. The wheels 60 may be mounted in a same plane (e.g. bottom plane of the housing 66). One or both of the wheels 60 may be a pulley. The wheels 60 may form a pair of interconnected wheels. In other words, the rotation of the wheels 60 may be linked. In the embodiment shown in FIG. 1A, the wheels 60 have the same size, e.g. diameter, and thus rotate at the same rate. The structure 56 may be mounted to the first and second wheels 60 and configured to rotate the wheels 60. That is, in use, when the connector 58 is moved, the structure 58 rotate the wheels 60. In the embodiment shown in FIG. 1A, the structure 56 is mounted around the two spaced apart wheels 60 that are also contained within the housing 66. That is, the structure 56 is configured as an endless loop around the first and second wheels 60. As such, the movement of the structure 56 may rotate the two wheels 60 at the same rate of rotation. The structure 56 may be attached to the wheels 60. In other words, a first end of the structure 56 may be attached to one of the wheels 60 and a second end of the structure 56 may be attached to another one of the pulleys 60. One or more of the wheels 60 may be a toothed wheel, and the structure 56 may include a chain configured to drive the toothed wheel. The motorized module 50 may include a brake configured to halt a movement of the structure 56. In other words, the brake may arrest, or fix the rotation of the wheels 60.

In the embodiment shown in FIG. 1A, the driver 52 is mounted between the wheels 60, and the leadscrew 54 is mounted between the wheels. In alternate embodiments, the driver 52, the leadscrew 54, or both, may be mounted in other suitable locations relative to the housing 66 to rotate the wheels 60. This configuration may provide a low profile and compact design of the motorized module 50.

Figure 1B:
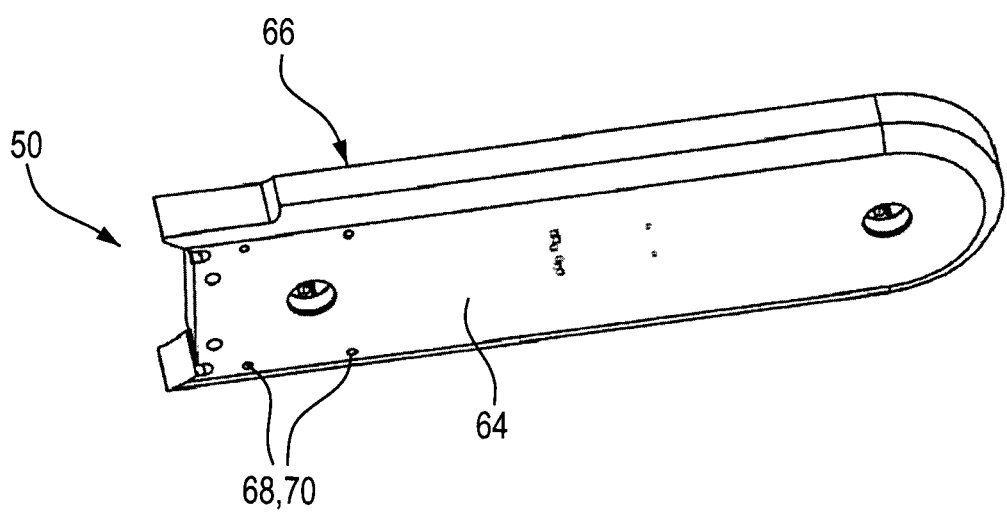
FIG. 1B illustrates an assembly of the motorized module shown in FIG. 1A, showing the motorized module covered with a cover.

FIG. 1B illustrates a cover 64 mounted to the housing 66 of the motorized module 50. The cover 64 may be attached to the housing 66 through screws 68. Holes 70 may be defined in the cover 64 to receive the screws 68 to secure the cover 64 onto the housing 66.

Figure 1C:
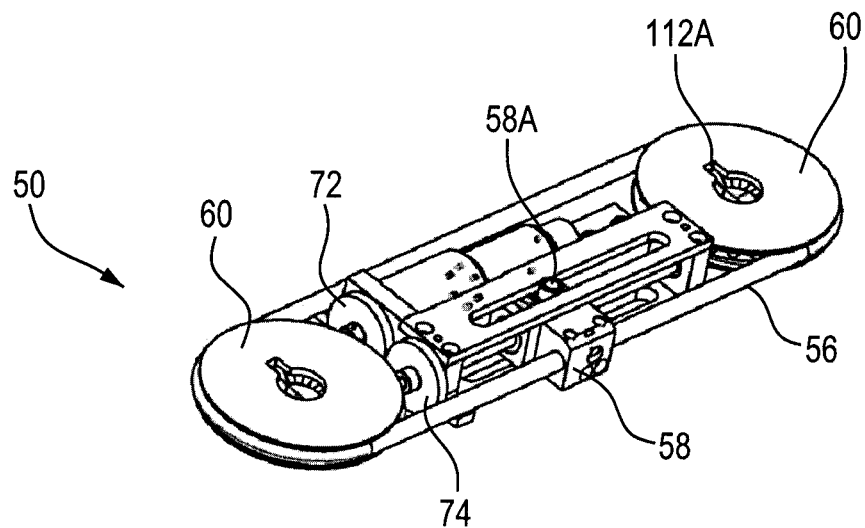
FIGS. 1C-1D illustrate a mechanism of rotation including the pulleys and a hollow shaft cooperating with the pulley and bearings.
Figure 1D:
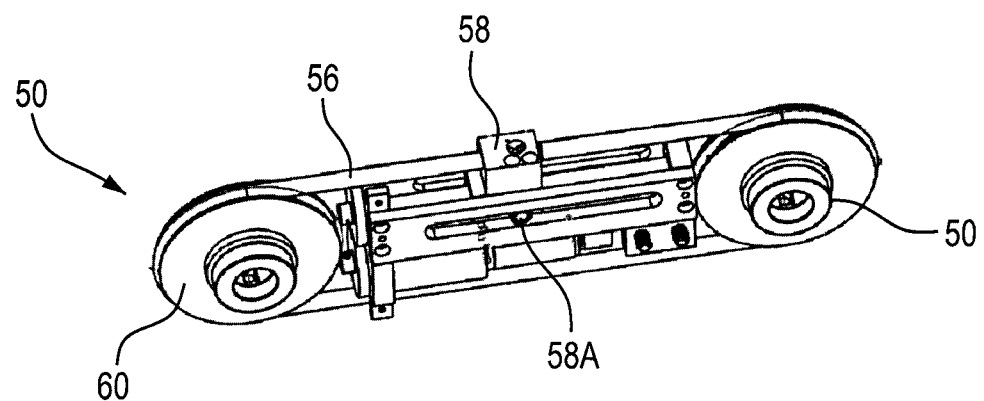

FIGS. 1C-1D illustrate other views of the motorized module 50. As shown in FIG. 1C, the driver 52 rotates a gear 72 which in turn rotates an adjacent second gear 74 attached to the leadscrew 54. As such, the second gear 74 rotates the leadscrew 54 to move the connector 58 along, or parallel, to the second longitudinal axis of the leadscrew 54. As the connector 58 moves, the structure 56 moves a corresponding distance. A pin 58A may be connected to the connector 58 to extend through a slot defined in the housing 66. The slot may define a range of movement of the connector 58. The slot may extend in a direction parallel to the second longitudinal axis. A key 112A may be defined in the wheel 60 to receive a corresponding key from a shaft.

Figure 1E:
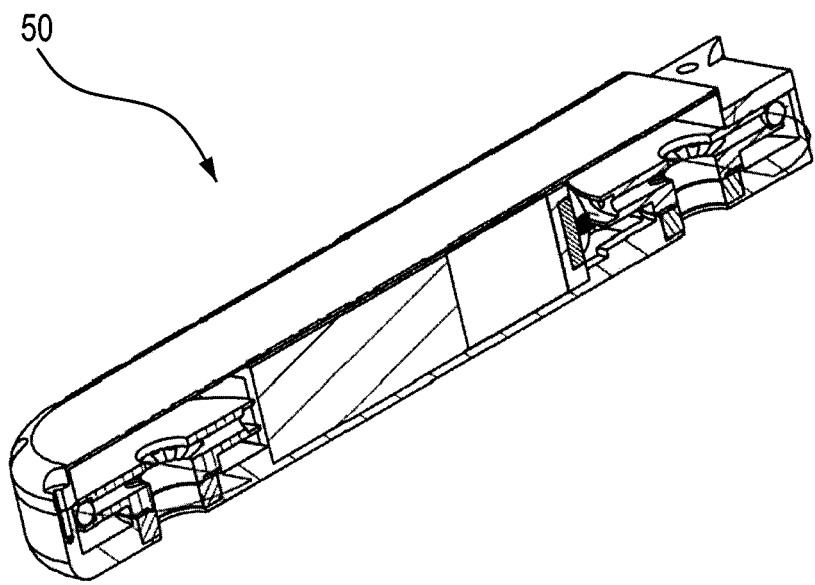
FIG. 1E illustrates a cross-sectional view of the assembly of the motorized module of FIG. 1B.

FIG. 1E illustrates a cutaway of the motorized module 50.

Figure 1F:
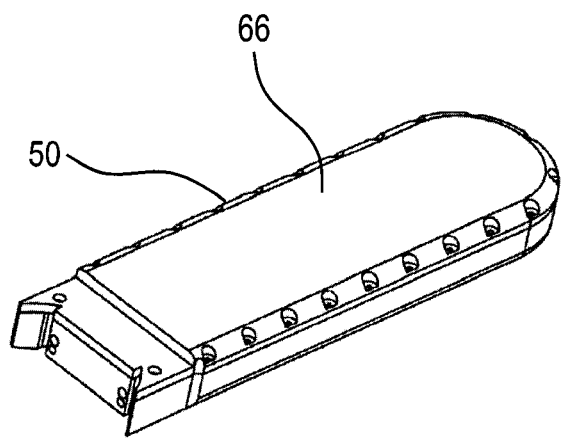
FIGS. 1F-1G illustrate different views of the motorized module of FIG. 1B.
Figure 1G:
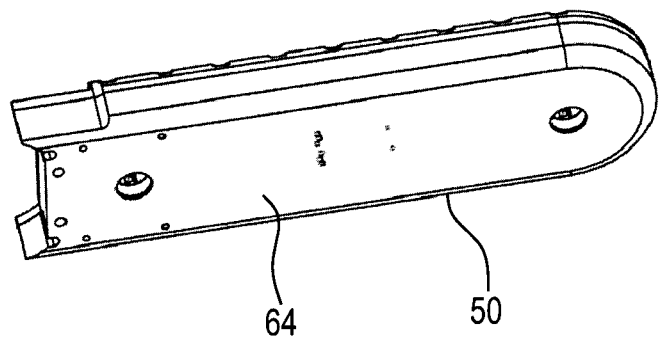

FIGS. 1F-1G illustrate the assembled motorized module 50. As may appreciated in FIGS. 1F-1G, when assembled, the motorized module 50 is compact and can be used as a "plug and play" module.

Figure 2:
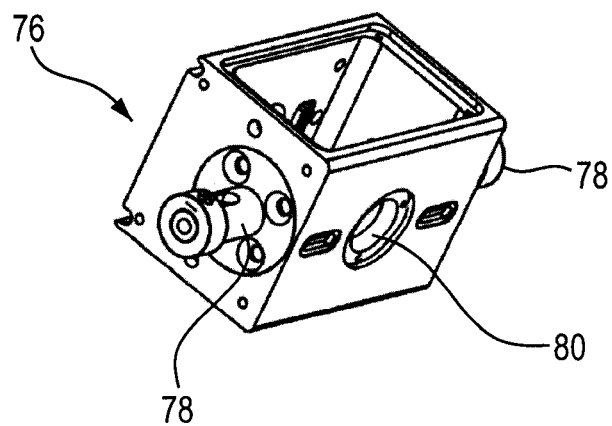
FIG. 2 illustrates a base module connected on each side to a fixed shaft, all shafts are hollow shafts in order to pass wires or an extra pin through, also illustrates a hole in order to fix a camera therein.

FIG. 2 illustrates a base module 76. A shaft 78 may be fixed on each of two opposed sides of the base module 76. The shafts 78 may be hollow in order to pass wires or the like, or a pin therethrough. An aperture 80 may be defined in the base module 76. The aperture 80 can be used to attach an instrument or a payload, such as a camera, on the base module 76. One or motorized modules 50 may be coupled to the base module 76. The wheel 60 may be mounted to the shaft 78.

Figure 3A:
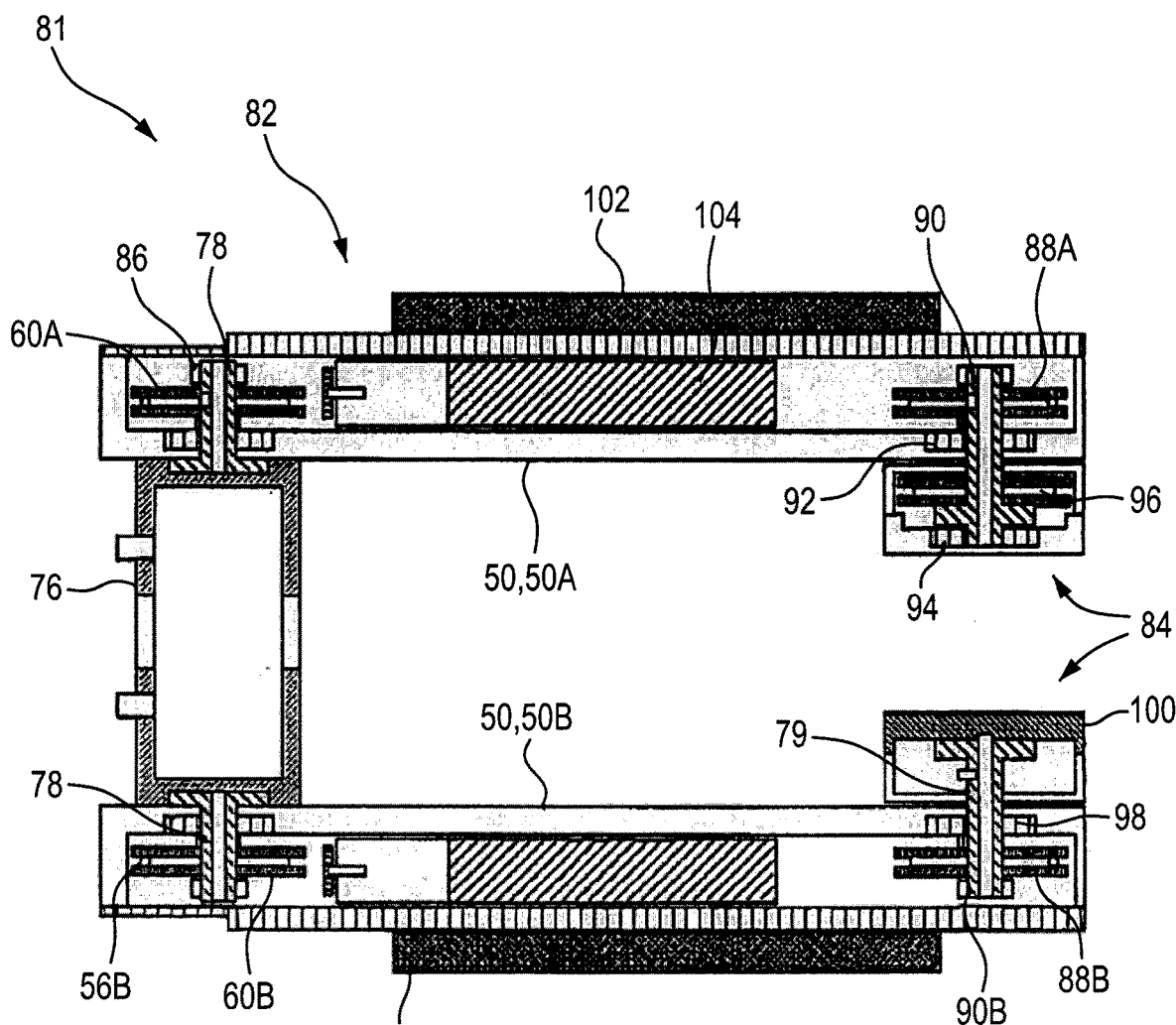
FIG. 3A illustrates a manipulator arm including a first module connected to a portion of a second module.

FIG. 3A illustrate a manipulator arm 81 for a modular robotic structure. The manipulator arm 81 may include the base module 76, a first module 82 coupled to the base module 76 and configured to rotate relative to the base module 76, and a second module 84 coupled to the first module 82 and configured to rotate relative to the first module 82. The term "arm", as used herein, is intended to encompass either a manipulator arm composed of a single arm element or an assembly comprising a multi-segment arm, where pairs of the segments may be interconnected by joints or the like.

The base module 76 has a first shaft portion 78, or support shaft, and a second shaft portion 78. The shaft portions 78 may refer to one shaft extending along a rotation axis. The shaft portions 78 may be two separate shaft extending from an end of the base module 76. In the embodiment shown in FIG. 3A, the shafts 78 extend in opposite directions. The first module 82 may be connected to a portion of the second module 84.

The first module may include a first pair of interconnected wheels and a second pair of interconnected wheels. The first pair of interconnected wheels has a first wheel 60A fixedly connected with the first shaft 78 and a second wheel 88A. The second pair of interconnected wheels has a third wheel 60B rotatably mounted on the second shaft 78 and a fourth wheel 88B. The second module 84 is drivingly engaged with the fourth wheel 88B. For example, a shaft 79 may be fixedly attached to the second module 84 and the fourth wheel 88B. As such, rotating the fourth wheel 88B would rotate the second module 84. The second module 84 may include a fifth wheel 96 drivingly engaged with the second wheel 88A.

A first module assembly may include the base module 76 and two motorized modules 50. The base module 76 may be connected between the two motorized modules 50 to form a C-shaped module of the first module assembly. As such, the first wheel 60A correspond to a wheel 60 of the first motorized module 50A and the third wheel 60B corresponds to another wheel 60 of the second motorized module 50B.

As mentioned before, the shaft 78 may be non-rotatably attached to the base module 76. In use, the wheel 60A of the first motorized module 50A rotates, or turns, around the shaft 78. A ring 86 may be mounted at an end of the shaft 78 to secure the wheel 60A in place around the shaft 78. At the other end of the motorized module 50A, wheel 88A may rotate a shaft 90. Bushings or bearings 92 and 94 may be provided to the rotatable shaft 90. Bearing 92 may be fixed on the motorized module 50A. Bearing 92 may be fixed on the portion of the second module 84. In operation, the wheel 88A may rotate the shaft 90 to rotate the fifth wheel 96 of the second module 84. The fifth wheel 96 may be fixed on the shaft 90 to rotate therewith.

The second motorized module 50B, similarly to the first motorized module 50A, may have the belt 56B to rotate the third wheel 60B around shaft 78 and to rotate fourth wheel 88B around shaft 90B. The shaft 90B may rotate around bearing 98 mounted on the second motorized module 50B. Unlike the connection between the first motorized module 50A and the portion of the second module 84, the shaft 90B is non-rotatably attached to the portion of the second module 84. Thus the shaft 90B is fixed, or non-rotationally attached, to the second module 84 to allow the rotation of the second module 84 relative the second motorized module 50B of the first module 82. When the shaft 90B rotates, the portion of the second module 84 rotates relative to the second motorized module 50B. The shaft 90B can be attached to a cover 100 or a wall of the second module 84. In the embodiment shown in FIG. 3A, the two shafts 90 and 90B are used to rotate the second module 84 relative to the first module 82.

Each motorized module 50A, 50B, of the first module 82 may have an attachment 102 in order to include a battery 104 and/or a control unit.

Figure 3B:
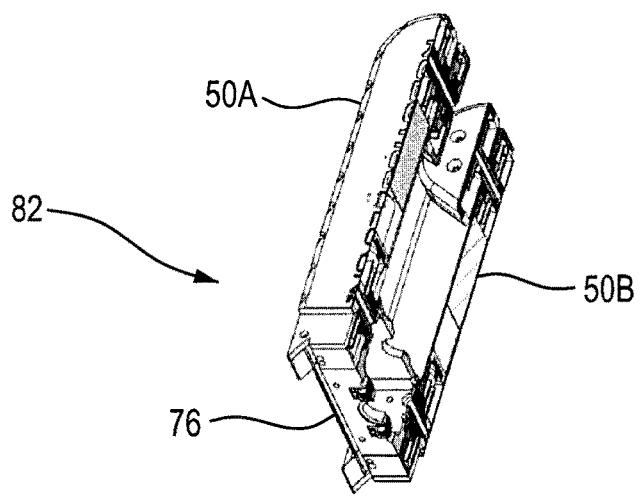
FIG. 3B illustrates a cutaway portion of the first module of FIG. 3A.

FIG. 3B illustrates a cutaway of the first module 82 showing the base module 76 and the two motorized modules 50A and 50B.

Figure 3C:
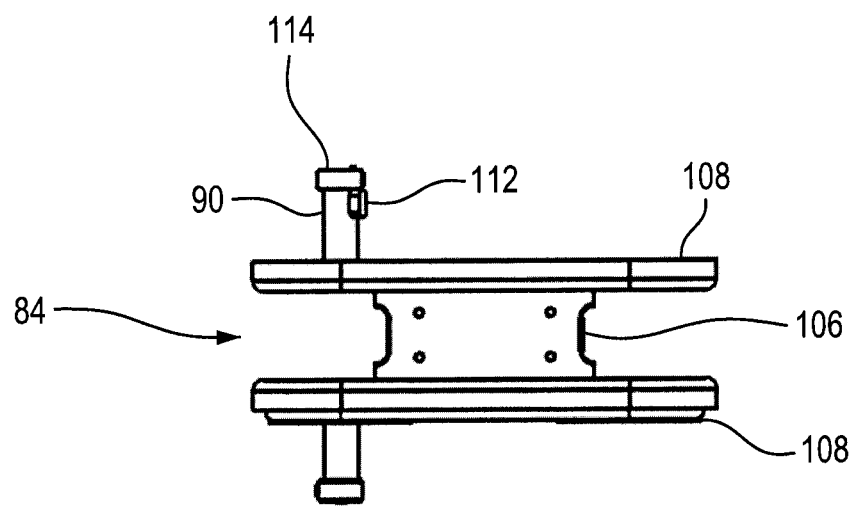
FIGS. 3C-3D illustrate the second module of FIG. 3A, the second module having an H-shape module.
Figure 3D:
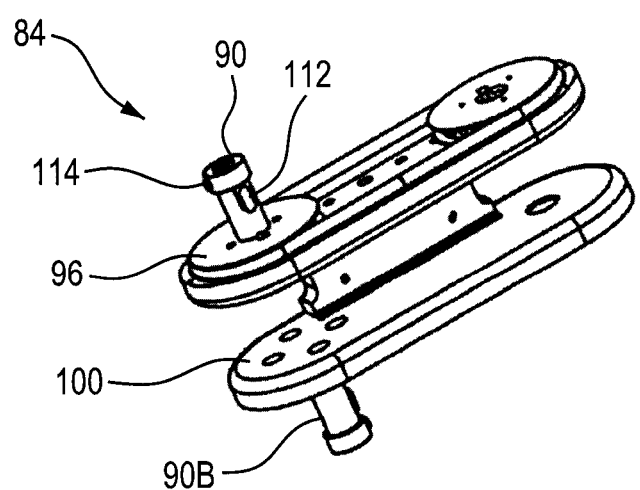

FIGS. 3C-3D illustrate the second module 84. The second module 84 may include a plate 106 and two motorized modules 108 connected on opposite sides of the plate 106. The motorized module 108 may be similar to the motorized module 50 described above. In the particular embodiment shown in FIGS. 3C-3D, the second module 84 forms an H-shape of the second module 84. In another particular embodiment, the second module 84 includes one or more non-motorized modules. The term "non-motorized" refer to a module that can transmit motion from one module to another, and does not necessarily have a powered motor. The shaft 90 is fixed, or non-rotatably attached, to the wheel 96 of the module 108. The shaft 90 may include a key 112 to connect the wheel 88A of the first motorized module 50A and a ring 114 to secure the wheel 88A in place around the shaft 90. The second shaft 90B is fixed, or non-rotatably attached, to the body 100 or wall of the second module 108.

Figure 4:
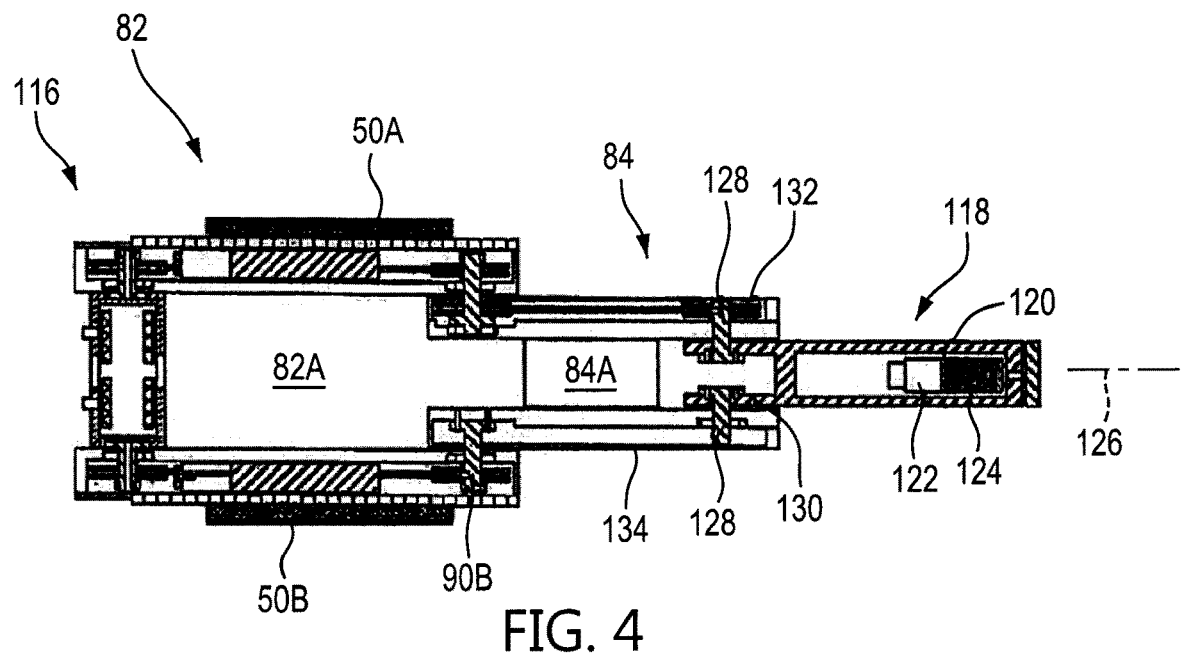
FIG. 4 illustrates a manipulator arm that can be used as a robot or a part of the robot, the manipulator arm includes three module.

FIG. 4 illustrates a manipulator arm 116 that can be used as a robot or a part of the robot. The manipulator arm 116 includes the first module 82, the second module 84 and a third module 118. The manipulator arm 116 may include additional modules.

In the embodiment shown in FIG. 4, the third module 118 has an arm 120 that is shown in a folded position into a cavity of the third module 118. The arm 120 can include a device, for example, an instrument, a robotic hand or a finger, a hammer and the like, as required by the robot. A motor 122 may be provided to rotate the device around the axis 126 and a motor 124 to rotate an object such as a hand or end effecter) attached to the arm. The device can rotate 360 degrees or more. The third module 118 can rotate at least 180 degrees around shafts 128. For example, relative to a longitudinal axis of the second module 84, the third module 118 can rotate at least between +90 degrees and −90 degrees. Shafts 128 are fixed on the third module 118. For example, shaft 128 may be attached to wall 130 of the third module 118 via screws. The third module 118 may be connected to the second module 84 via the shafts 128. The second module 84 may be connected to the first module 82 as described above.

In the embodiment shown in FIG. 4, the first motorized module 50A of the first module 82 is connected to a first motorized module 108A of the second module 84. As described above, the motor 52 of the first motorized module 50A of the first module 82 rotates the wheel 96 of the first motorized module 108A of the second module 84. The rotation of the pulley 96 is transmitted to a wheel 132 of the first motorized module 108A of the second module 84 via a belt of the second motorized module 108A. The wheel 132 rotates shaft 128 which is fixed to the third module 118 and consequently rotates the third module 118.

The second module 134 of the second module 84 is not motorized, i.e. does not include a motor. In this case, the shafts 90B and 128 within the second module 134 are not interconnected. In this particular embodiment, the manipulator arm 116 may include one H-shape second module 84. In other embodiments, the manipulator arm 116 can include multiple H-shape modules 84 interconnected between the first module 82 and the arm 120 to form a longer manipulator arm. The combination of shapes can be C-H-C, C-H-H, H-C-H, and the like. The C-shape module can be inside or outside the H-shape module.

The first module 82 may have a first compartment 82A defined therein between two spaced-apart longitudinal first arm elements. The first arm elements may define a boundary of the first module 82. The first arm elements may include the motorized modules 50A, 50B. The second module 84 may have a size and shape that is insertable in the first compartment 82A. In other words, the second module 84 is configured to be inserted in the first compartment 82A. The first module 82 may have a rectangular shape. The second module 84 may have a rectangular shape. The first compartment 82A may define a first volume that is equal to or greater than a volume of the second module 84 to receive the second module 84 in the first compartment 82A.

The second module 84 may have a second compartment 84A defined therein between two spaced-apart longitudinal second arm elements. The second arm elements may define a boundary of the second module 84. The second arm elements may include the motorized modules 50A, 50B. The third module 118 may have a size and shape that is insertable in the second compartment 84A. In other words, the third module 118 is configured to be inserted in the second compartment 84A. The third module 118 may have a rectangular shape. The second compartment 84A may define a second volume that is equal to or greater than a volume of the third module 118 to receive the third module 118 in the second compartment 84A.

Figure 5:
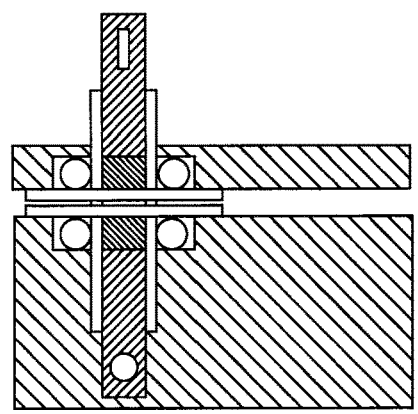
FIG. 5 illustrates a section of a module.

FIG. 5 illustrates an embodiment of a connection between two module 82, 84. In this embodiment, a shaft is inserted in a hollow shaft that retain module 82 to module 84 by a pin extending between the two shafts.

Figure 6:
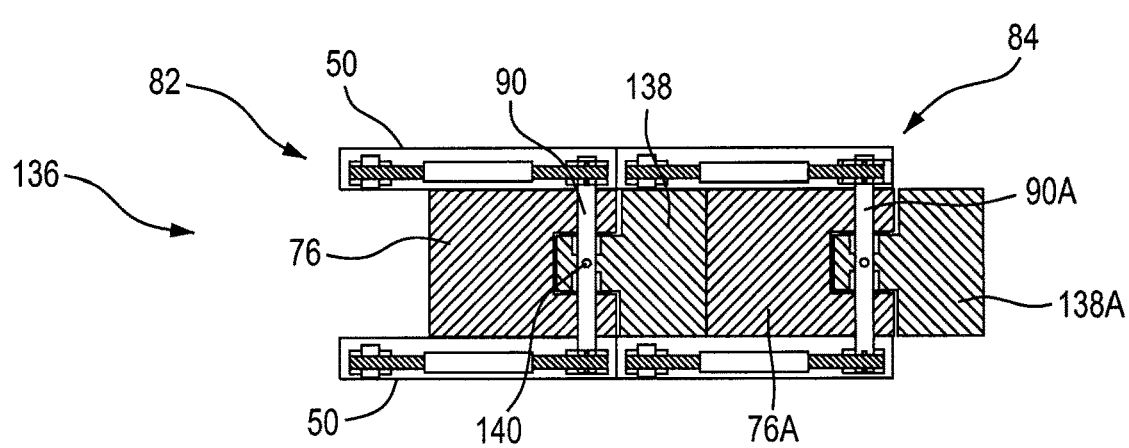
FIG. 6 illustrates an manipulator arm in accordance with another embodiment, a manual modular manipulator arm is transformed into a motorized arm using a motorized module on each side.

FIG. 6 illustrates an manipulator arm 136 in accordance with another embodiment. The first module 82 includes the base module 76 and two motorized modules 50. It can also include only one motorized module 50 instead of the two motorized modules. The first module 82 can include one motorized module 50. The base module 76 is connected to a rotary module 138 through the shaft 90. The shaft 90 of the first module assembly 82 is fixed to the rotary module 138 with a pin 140. Thus the shaft 90 rotates the rotary module 138 relative to the base module 76. The rotary module 138 is attached to a base module 76A of a second module 84. Consequently, the rotation of the rotary module 138 of the first module 82 rotates the base module 76A of the second module 84. The second module 84 includes a rotary module 138A connected to the base module through a shaft 90A. The second module 84 includes one or more motorized modules 50 to rotate the shaft 90A. The shafts 90, 90A can rotate using a pulley system or a cam system. The rotary module 138, 138A rotates ±90 degrees around the shaft 90, 90A. In this particular embodiment, both of the motorized modules 50 are coupled to the shaft 90 to rotate the shaft 90 with coordination. The torque applied to the shaft 90 can thus be increased. In the shown embodiment in FIG. 14, the shaft 90 extends bore to bore. The rotary module 138A of the second module 84 can be attached to subsequent module to form the manipulator arm 136 with a plurality of modules attached in series.

Figure 7A:
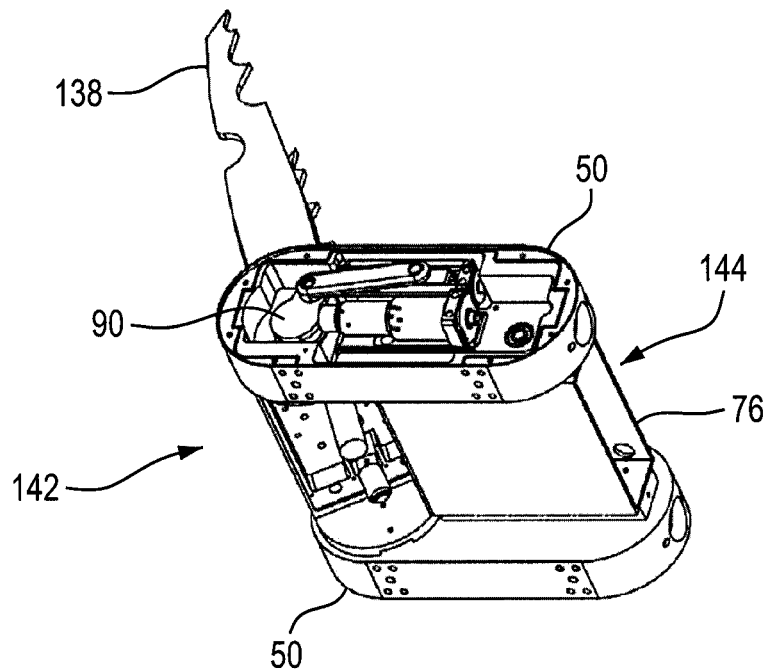
FIG. 7A illustrates a mobile robot formed from two motorized modules attached to a base.

FIG. 7A illustrates a mobile robot 142 formed from two motorized modules 50 attached to a base module 76. A rotary module 138 is attached to a rotatable shaft 90. In this embodiment, the shaft 90 rotates ±90 degrees around a longitudinal axis of the shaft 90. The base module 76 defines a box 144 to receive a removable battery and/or a control and communication system for the robot 142.

Figure 7B:
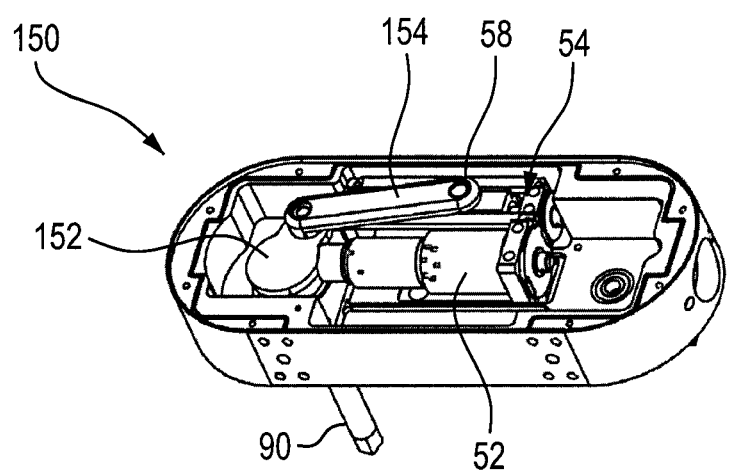
FIG. 7B illustrates a motorized module in accordance with another embodiment, this module use a cam systems associated to a linear motorized movement, this cam system allows the rotation of 180 degrees of the shaft.

FIG. 7B illustrates a motorized module 150 in accordance with another embodiment. The motorized module 150 includes a cam 152 and follower 154 system instead of the pulley and belt system. The follower 154 is pivotally mounted on the cam 152. The motorized module 150 includes a motor 52 and a linear screw 54 similarly to the ones described above. The follower 154 is connected to the attachment 58 of the linear screw 54. As such, the linear screw 54 moves the follower 154 to turn the cam 152. In a particular embodiment, the cam 152 rotates the shaft 180 degrees, i.e. ±90 degrees around the longitudinal axis of the shaft 90.

Figure 7C:
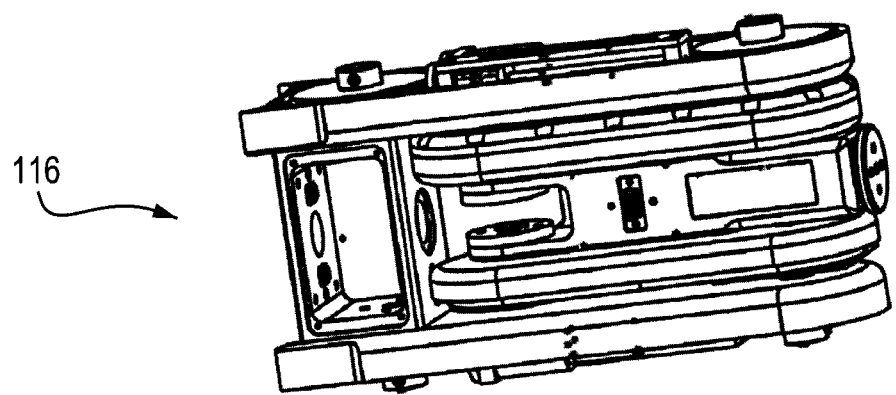
FIGS. 7C-7D illustrate the manipulator arm in a folded position (FIG. 7C) and in an extended position (FIG. 7D)
Figure 7D:
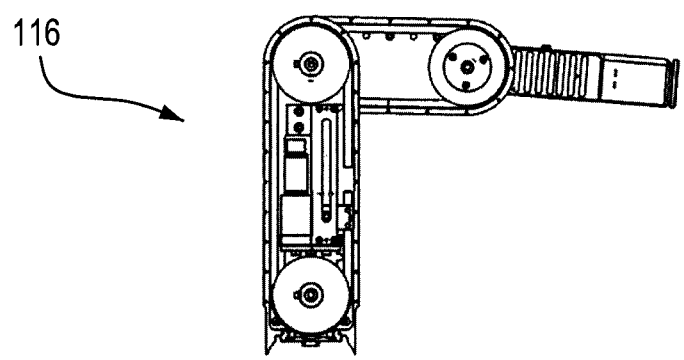

FIGS. 7C-7D illustrate the manipulator arm 116 in a folded position (FIG. 7C) and in an intermediate extended position (FIG. 7D). The manipulator arm 116 can further extend from what is shown in FIG. 7D. In other words, the manipulator arm 116 may be extend in a straight position.

Figure 8A:
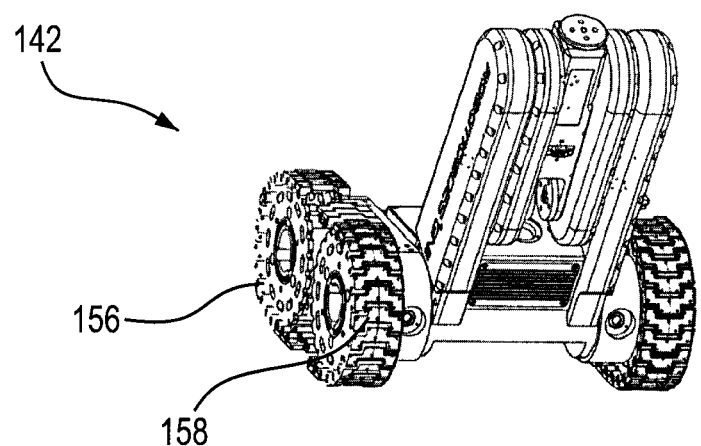
FIGS. 8A-8F illustrate a mobile robot using manipulator arm or arms.
Figure 8B:
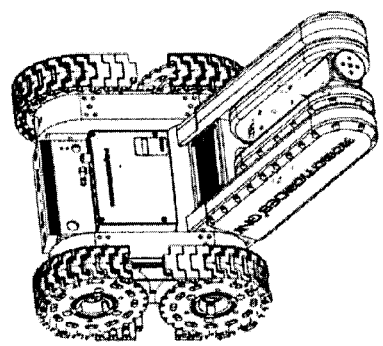
Figure 8C:
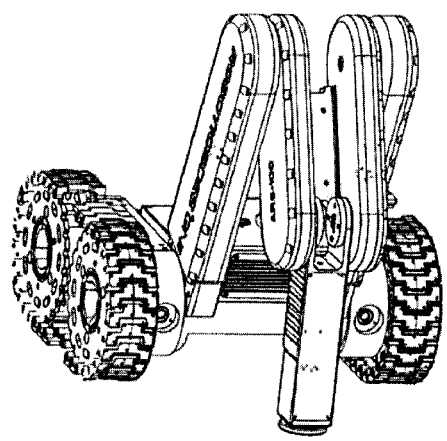
Figure 8D:
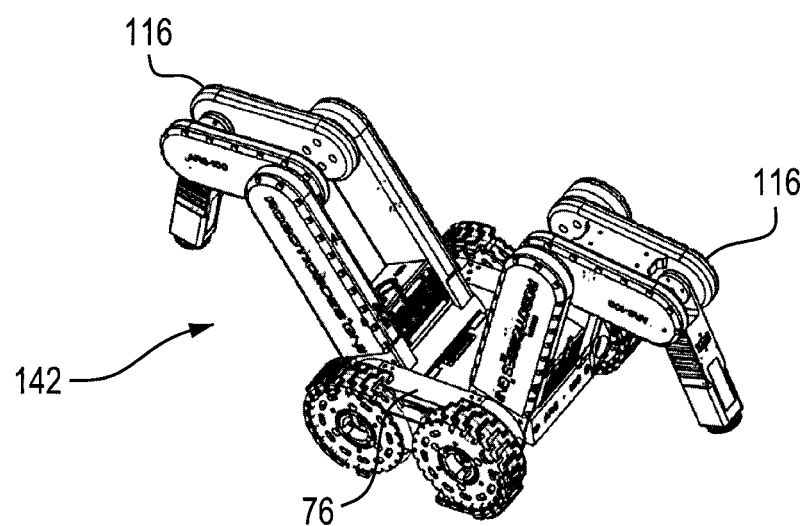

FIGS. 8A-8D illustrate a mobile robot 142 mounted on wheels 156 in various positions and/or configurations. Tracks 158 are partially shown in FIGS. 8A-8D. Optionally, the mobile robot 142 can include tracks 158. In FIG. 8D, the mobile robot 142 includes two manipulator arms 116 mounted on chassis or a base module 76.

Figure 8E:
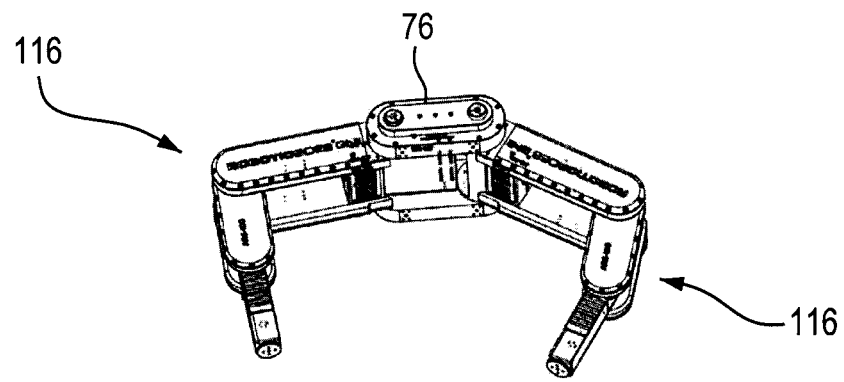
Figure 8F:
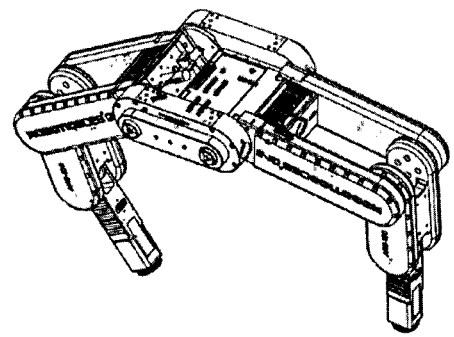

FIGS. 8E-8F illustrate two manipulator arms 116 mounted one base module 76. In the embodiment shown, the H-shape module 76 is combined with an internal C-shape module on each side. Each C-shape module is further combined with an internal H-shape module. In FIG. 8F, the manipulator arms 116 are combined into a walking robot.

Figure 9:
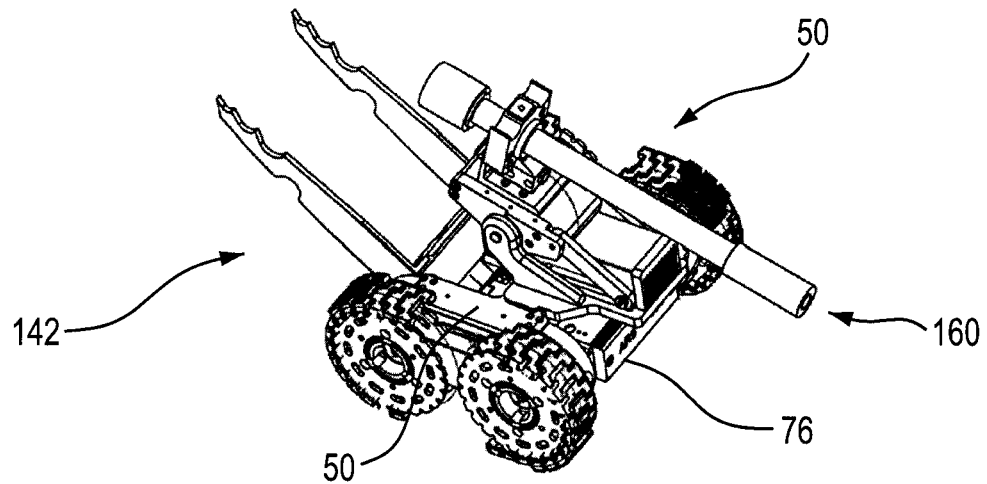
FIG. 9 illustrates the mobile robot configured for use in Explosive Ordnance Disposal (EOD) applications, formed by two motorized modules and one C shape module pivoting ±90 degrees with a disrupter on top.

FIG. 9 illustrates the mobile robot 142 configured for use in Explosive Ordnance Disposal (EOD) applications. The mobile robot 142 includes two motorized modules 50 mounted on a base module 76. A C-shape module is connected to the motorized modules and is rotatable ±90 degrees around axis x. In this embodiment, a disrupter 160 is mounted on the C-shape module.

Figure 10A:
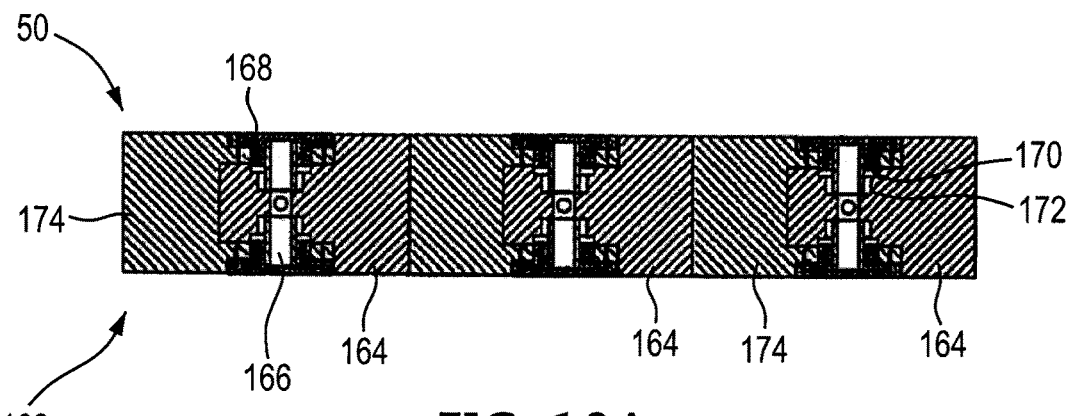
FIGS. 10A-10C illustrates a modular manipulator arm having a manually moving module (FIG. 10A) and a modular manipulator arm transformed into a motorized arm by attaching motorized modules (FIG. 10C)
Figure 10B:
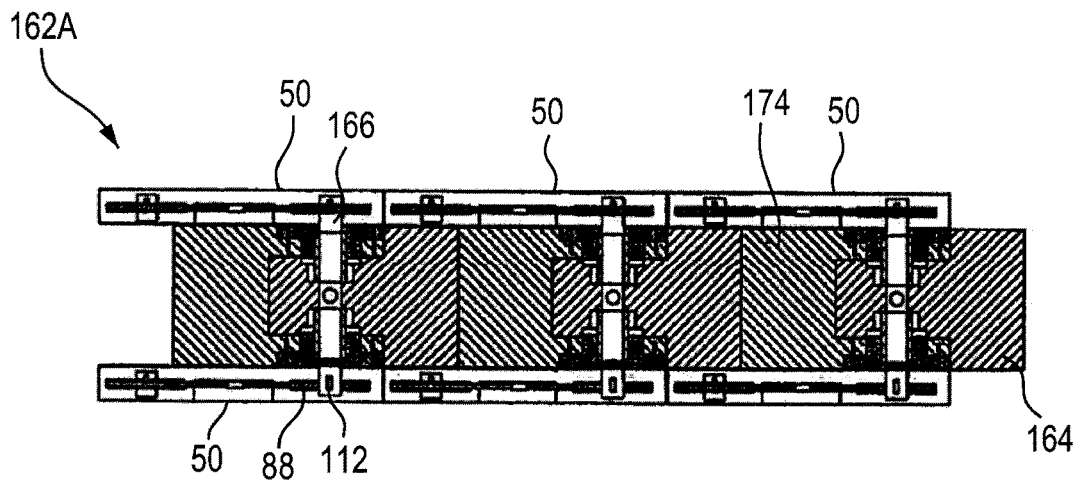
Figure 10C:
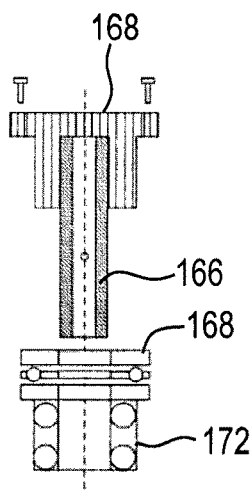

FIG. 10A illustrates a modular manipulator arm 162 having a manually moving module 164, that is a non-motorized module. An example of such modular articulated arm is described in U.S. Pat. No. 6,323,615. A charge (not shown) can be attached to the module 164. The module 164 rotate ±90 degrees around shaft 166. The shaft 166 can be hollow or plain (solid). In an embodiment using a hollow shaft 166, another shaft can be inserted inside the hollow shaft to allow a rotation. The manual structure can be transformed into a motorized structure by adding a module containing a motor which is connected to the manual structure through the hollow shaft of the manual structure to turn one module relative to the other. When the motor is removed, the structure can be used manually rotated. Thus, we can transform a manual structure into a motorized structure and vice versa. The motor can be a motorized module 50.

The hollow shaft 166 is fixed on cap 168. The module 164 has a fixed trust 170 and rotating bearing 172. The cap 168 is fixed to module 174. This combination allow the module 164 to turn freely relative to module 174 in such a way that gravity can compensate a portion of the force needed to do the movement independent of the weight of the charge attached to the module 164.

Referring to FIGS. 10A-10C, 162A is the modular manipulator arm 162 transformed into a motorized arm (FIG. 10B) by attaching the motorized modules 50. This transformation can be done by retrofitting the modular articulated arm 162 with motorized modules 50, as described above. In this embodiment, the shaft 166 includes a key 112 in order to attach the shaft 166 to the pulley 88 of the motorized module 50. Consequently, the pulley 88 rotates the shaft 166 instead of manually rotating the module 164 relative to module 174. A second motorized module 50 can be optionally used to increase the torque transmitted to the shaft 166, for example, when the arm 162 is used as an elephant trunk.

The base module 76, the first module 82, the second module 84, and/or the third module 118 may be connected via a communication system to communicated data or instructions commands between the modules 76, 82, 84, 118. For example, the communication system may include wires, wireless antennas, and the like.

Referring to FIGS. 11A-11E, the manipulator arm 116 is shown mounted on a drone 176. The manipulator arm 116 is similar to the manipulator arms described above. The manipulator arm 116 attached on the drone 176 can be controlled in order to manipulate objects and/or to capture a second drone in the flight, for example to ensure a security area or to take down unauthorized drones, i.e. like a "police" drone application. The manipulator arm 116 can also pick objects and placed them on a basket 194 (FIG. 11G). The basket 194 can be placed on or in the drone 176.

The drone 176 may be formed by a light weight sandwich panel. The panel may include a central body 178 and two outer disks 180. The disks 180 are mounted on opposite sides of the central body 178. In a particular embodiment, the central body 178 is constructed from carbon fiber and/or plastic materials. These materials may be manufactured with a 3D printer. Other materials may also be used. The body 178 includes propulsion cylinders 182 and compartments for battery, control systems, navigation, cameras and sensors. The propulsion cylinder 182 may refer to or include an "engine" or an "engine cylinder".

Figure 11A:
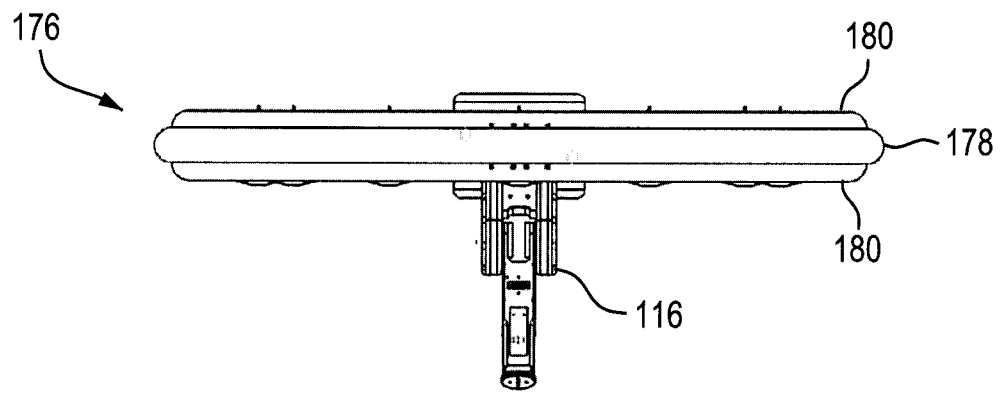
FIGS. 11A-11K illustrate a manipulator arm mounted on a drone.
Figure 11B:
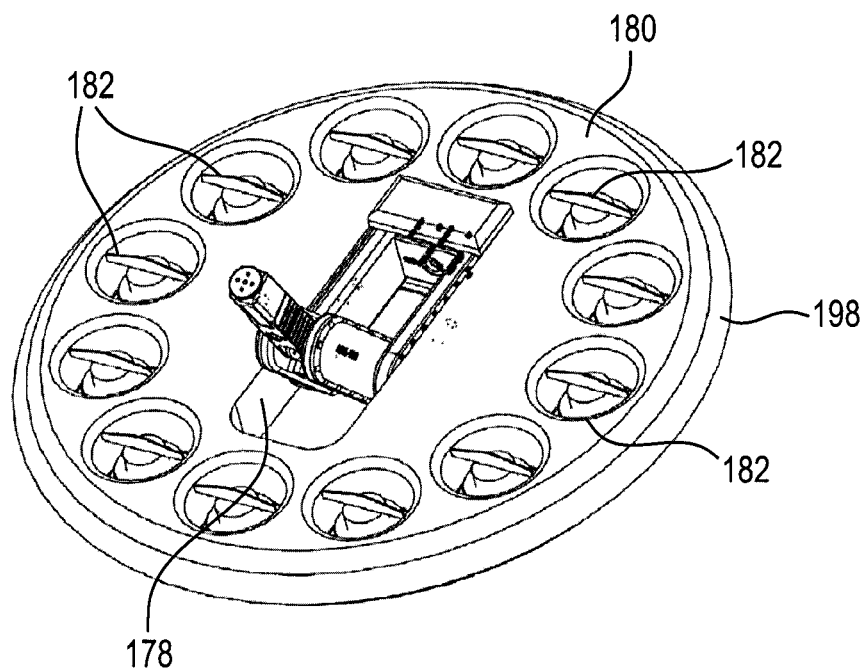
Figure 11C:
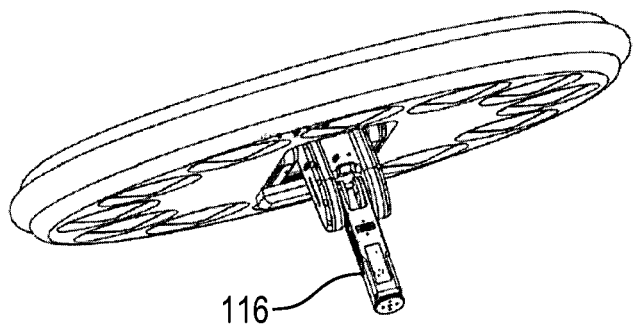
Figure 11D:
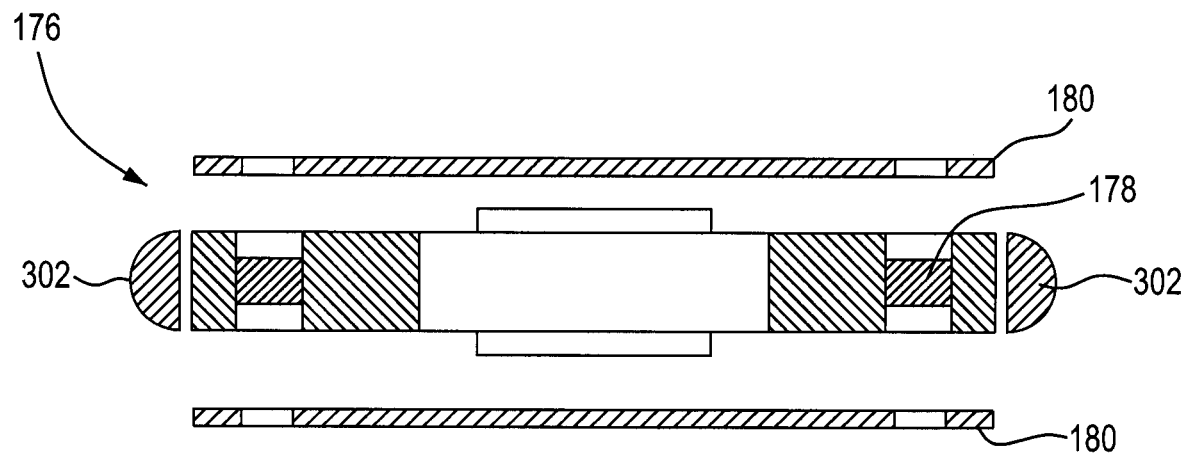
Figure 11E:
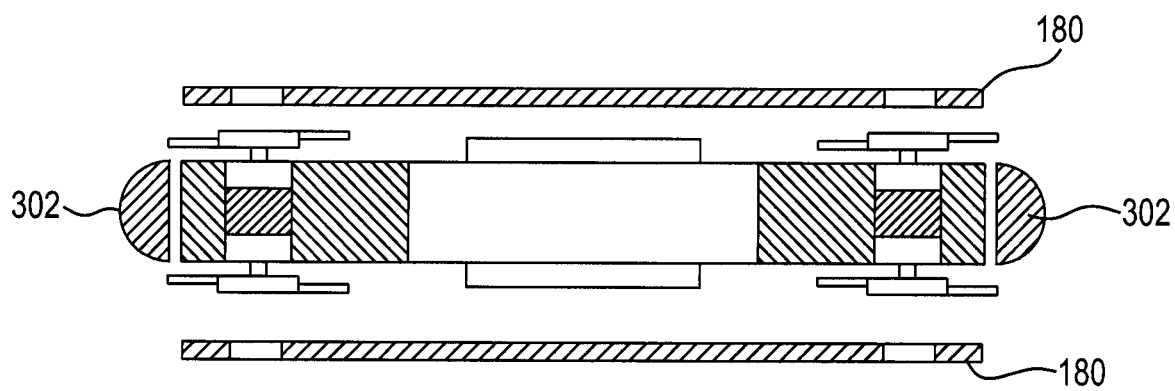
Figure 11F:
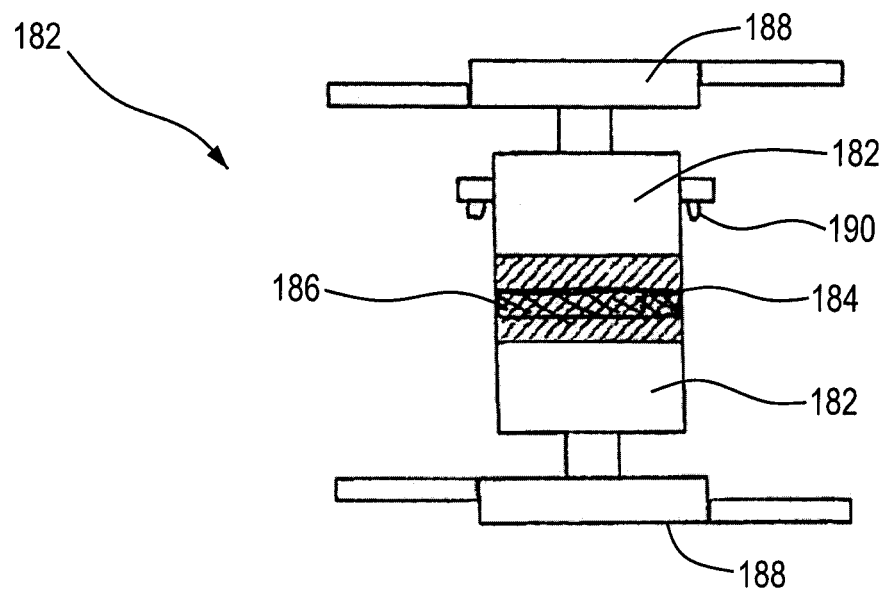
Figure 11G:
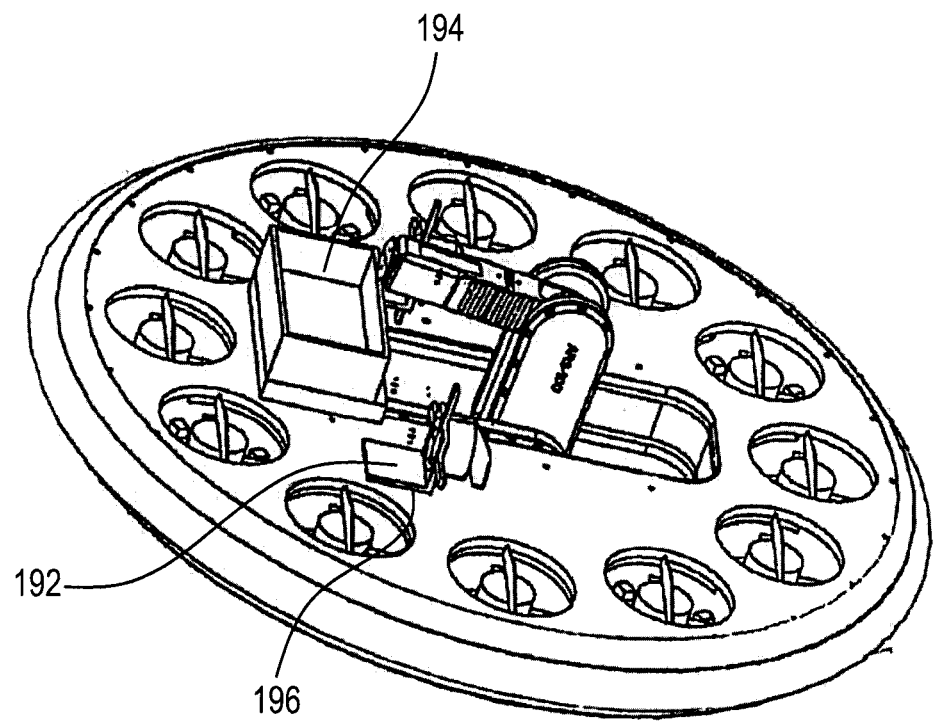

Referring to FIG. 11F, each engine 182 has a respective controller 184, battery 186 and propeller 188. The propeller 188 can be placed on one side of the propulsion cylinder 182 or on both sides thereof. The engine 182 can be inserted into the body 178 of the drone 176 through a "plug and play" mechanism. The "plug and play" feature allows a modular configuration of the engines 182. Thus, a user can configure the drone 176 with the appropriate number of engines 182. For example, the drone 176 can be include 3 to 12 engines 182. In the embodiment shown, the body 178 has twelve cylinders or engines 182. If all the engines 182 are installed, i.e. the twelve engines, then the number of activated engines 182 can be determined by an algorithm in order to distribute the force (e.g. load) and optimize the power needed for the task. In a particular embodiment, the drone 176 can activate four of the twelve engines 182. Additional engines may be activated when more power is needed. The ability to control the number and/or the sequence of the engines 182 can allow additional flying capacity of the drone 176 in order to rotate the drone 176 in three degrees of freedom XYZ (3-DF) (FIGS. 11G-22H). These degrees of freedom include at least roll, yaw and pitch motions. Electrical connectors 190 (FIG. 11F) are also provided to connect the propulsion cylinders 182 with other components and compartments to provide, for example, electrical energy and/or control commands. In the embodiment shown, electrical connector 190 is engaged directly from the engine 182 to the central body 178.

Referring to FIG. 11G, additional engines 192 are mounted on a surface of the disk 180 of the drone 176 through a bracket 196. The engines 192 are configured for use in water. As such, the drone 176 may be used like a hydro craft by floating on the surface of the water while the engines 192 are submerged in the water.

Figure 11H:
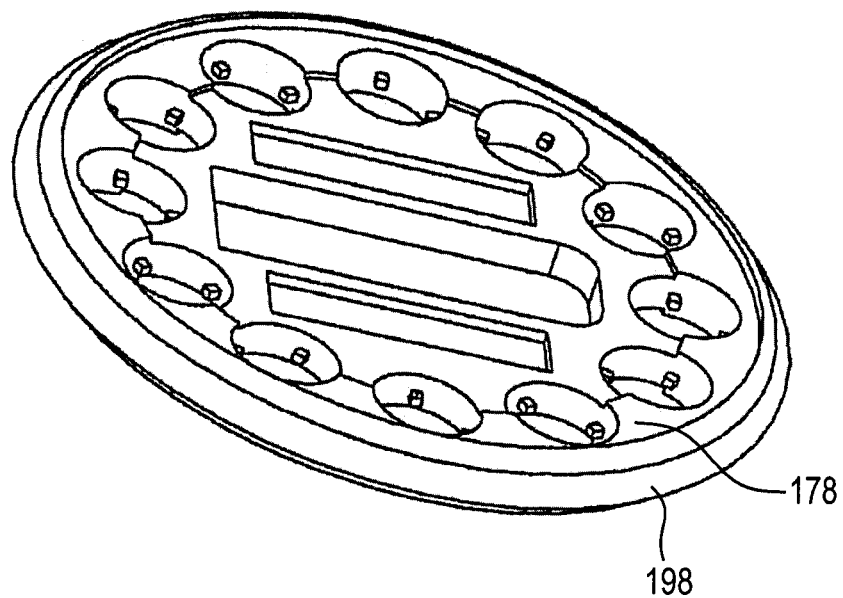
Figure 11I:
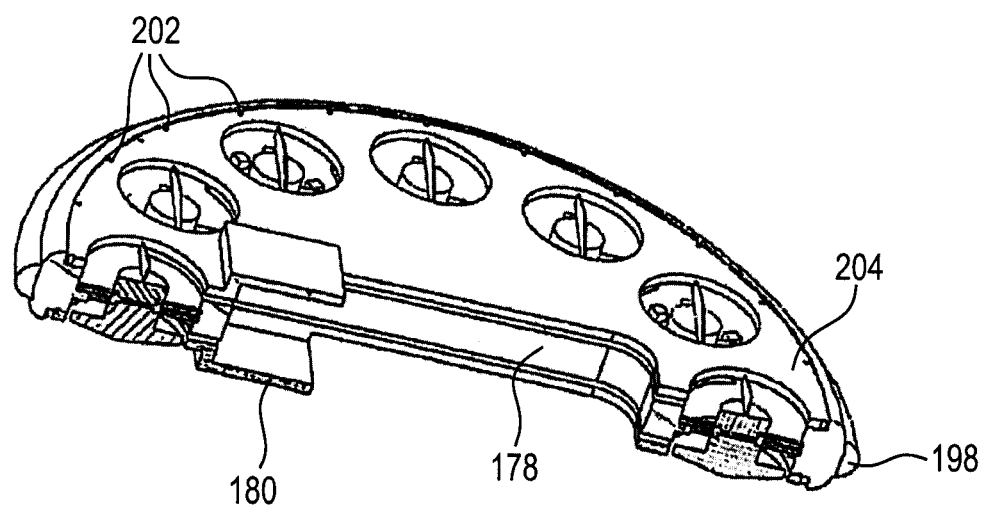
Figure 11J:
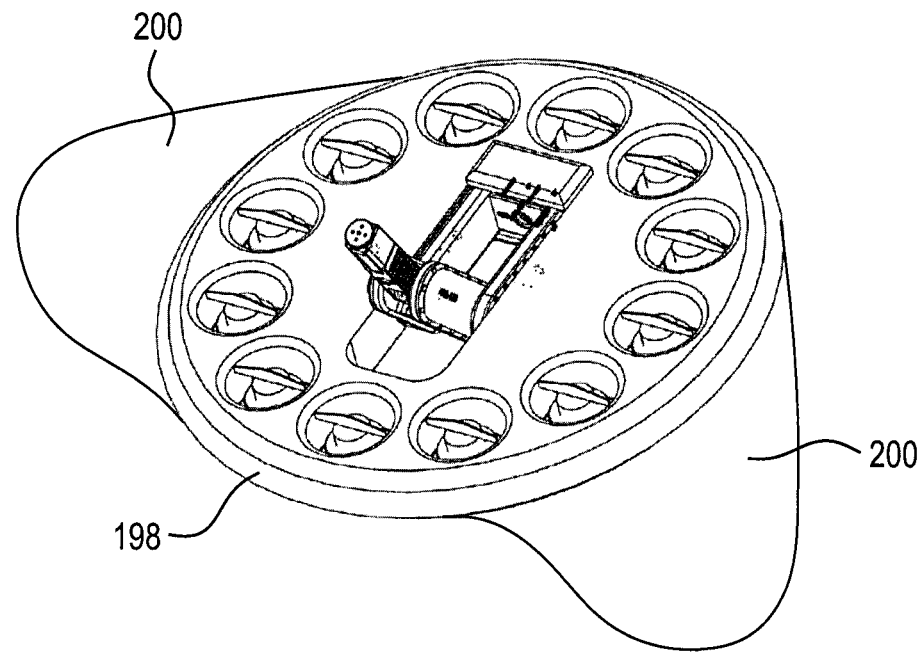
Figure 11K:
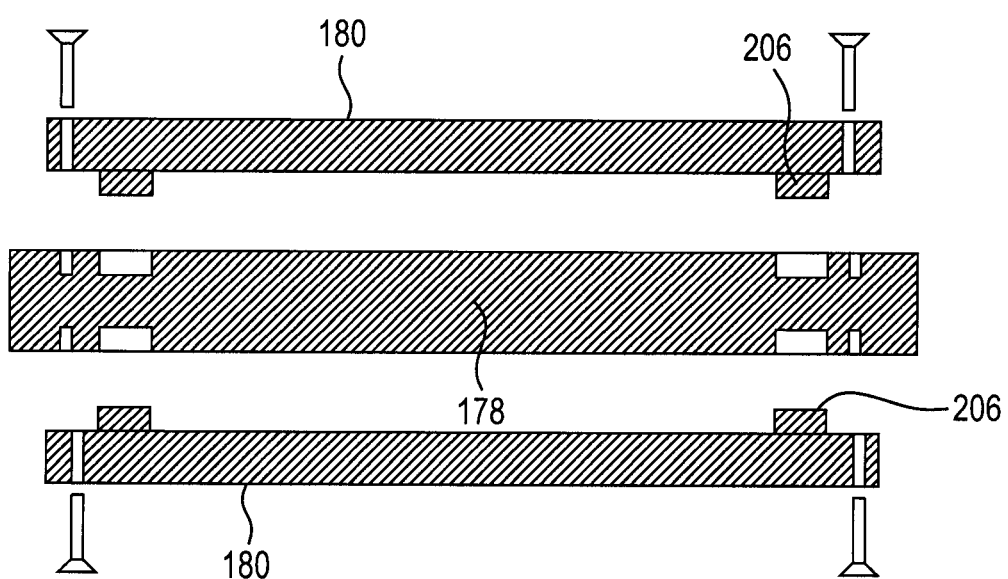

Referring to FIGS. 11H-11J, a round pneumatic ring 198 is attached to the body 178 in order to allow the drone 176 to float on water and/or to protect the drone 176 in collisions. The pneumatic ring 198 may be filled with a gas that is lighter than air. In the embodiment shown in FIG. 11J, the pneumatic ring 198 has an aerodynamic wing shape 200 instead of the round shape in order to make the drone 176 a planer drone using a pneumatic wing 200. The wing 200 can be folded into the body 178 and optionally inflated into the wind shape for aerodynamic benefits. The wing 200 can be filled with any suitable gas. One or both disks 180 can be attached by screws 202 and covered by a solar panel 204. The final assembly provide a waterproof characteristic using a rubber joint 206 (FIG. 11K).

Figure 12A:
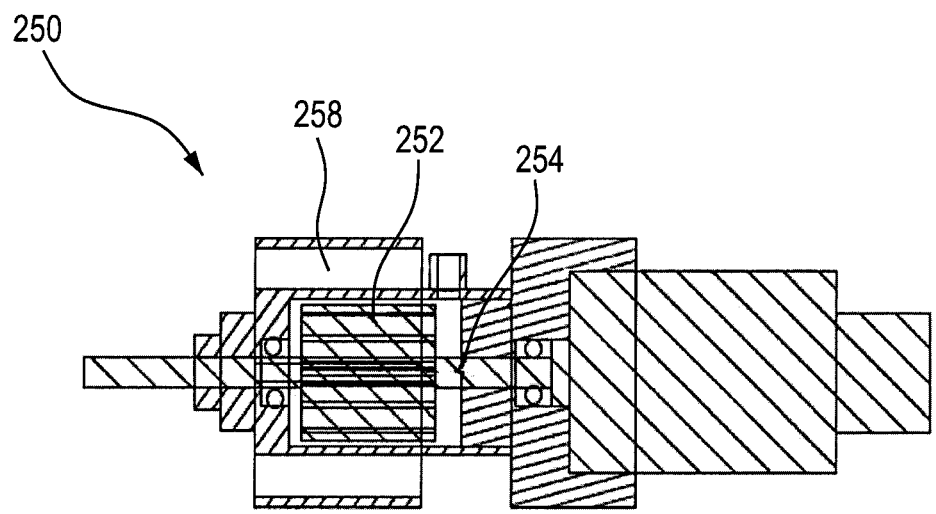
FIG. 12A illustrates a cross-sectional view of a motor using a ferrofluid brake.
Figure 12B:
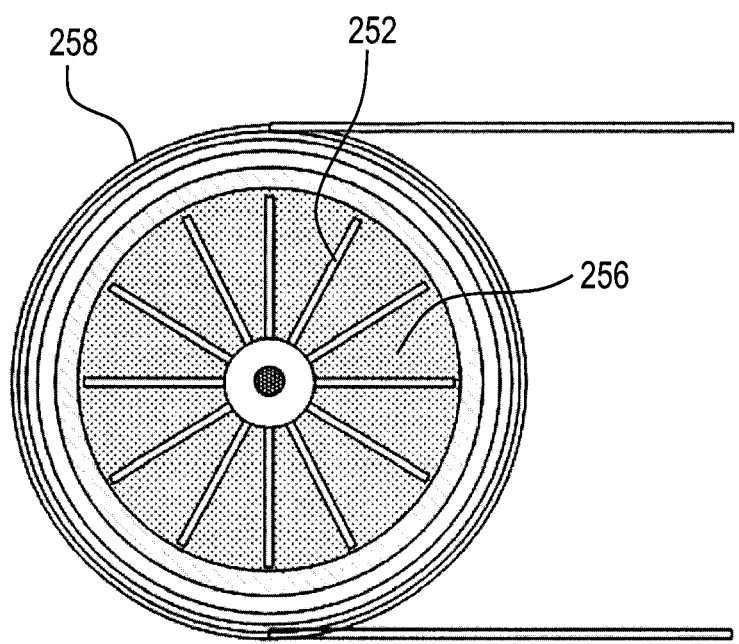
FIG. 12B illustrates a turbine surrounded by the ferrofluid.

Referring to FIGS. 12A-12B, a motor 250 is shown. The motor 250 has a ferrofluid braking system which includes a rotatable turbine 252 fixed to a shaft 254. The turbine 252 and the shaft 254 rotate together. The turbine 252 is located in a cavity of a cylinder filled with a ferrofluid 256. A solenoid 258 is mounted around the cavity to magnetically engage the ferrofluid 256 when the solenoid 258 is activated. The viscosity of the ferrofluid 256 can adjusted, for example from a liquid state to a solid state by applying a current in the solenoid 258. The viscosity depend on the current supplied to the solenoid 258. Thus, the friction between the turbine 252 and the ferrofluid 256 can be adjusted depending on the intensity of the current applied in the solenoid 258. If the ferrofluid is changed to the solid state, the turbine may not be able to rotate. This can allow the motor 250 to control the shaft movement, e.g. braking of the shaft 254, in an ON/OFF mode. In a particular embodiment, when the solenoid 258 is activated by the current, i.e. switched ON, the motor 250 brake the movement of the shaft 254. When the solenoid 258 is deactivated, i.e. switched OFF, the shaft 254 rotate.

The above description is meant to be exemplary only, and one skilled in the art will recognize that changes may be made to the embodiments described without departing from the scope of the invention disclosed. For example, the pulleys and belt system can be replaced with a cam and follower system or ferrofluid system for translating the axial movement of the linear screw to rotational movement of the shaft. Still other modifications which fall within the scope of the present invention will be apparent to those skilled in the art, in light of a review of this disclosure, and such modifications are intended to fall within the appended claims.

The invention claimed is:

1. A manipulator arm for a modular robotic structure comprising:
a base module having a first shaft portion extending from a first end of the base and a second shaft portion extending from a second end of the base, the first and second shaft portions extending in opposite directions along a first rotation axis;
a first module coupled to the base module and configured to rotate relative to the base module about the first rotation axis, the first module including a first pair of interconnected wheels and a second pair of interconnected wheels, the first pair of interconnected wheels having a first wheel fixedly connected with the first shaft portion and a second wheel, the second pair of interconnected wheels having a third wheel rotatably mounted on the second shaft portion and a fourth wheel; and
a second module coupled to the first module and configured to rotate relative to the first module, the second module being drivingly engaged with the fourth wheel of the first module; and
wherein the first module has a first compartment defined therein between two spaced-apart longitudinal first arm elements; and wherein the second module is rotatable relative to the first module between a folded position and an extended position, the second module being inserted in the first compartment in the folded position and at least partially positioned outside the first compartment in the extended position.

2. The manipulator arm as defined in 13, wherein the second module includes a fifth wheel drivingly engaged with the second wheel.

3. The manipulator arm as defined in claim 1, comprising a third module coupled to the second module and configured to rotate relative to the second module, and the second module includes a third pair of interconnected wheels having a fifth wheel drivingly engaged with the second wheel and a sixth wheel drivingly engaged with the third module.

4. The manipulator arm as defined in claim 1, wherein the first module includes a first motorized sub-module, and the first wheel of the first pair of interconnected wheels corresponding to a first wheel of the first motorized sub-module, the second wheel of the first pair of interconnected wheels corresponding to a second wheel of the first motorized sub-module.

5. The manipulator arm as defined in claim 4, wherein the first module includes a second motorized sub-module, and the third wheel of the second pair of interconnected wheels corresponding to a first wheel of the second motorized sub-module, the fourth wheel of the second pair of interconnected wheels corresponding to a second wheel of the second motorized sub-module.

6. The manipulator arm as defined in claim 5, wherein the base module is sandwiched between the first and second motorized sub-modules, each of the first and second motorized modules including:
- a driver;
- a leadscrew;
- a transmission drivingly connecting the driver to the leadscrew; and
- a connector coupled to the leadscrew and movable longitudinally along the leadscrew in response to a rotation of the leadscrew.

7. The manipulator arm as defined in claim 5, wherein the second module includes a third motorized sub-module and a fourth non-motorized sub-module, the third motorized sub-module drivingly connected to the first motorized sub-module of the first module, the fourth non-motorized sub-module drivingly connected to the second motorized sub-module of the first module.

8. The manipulator arm as defined in claim 1, wherein the first compartment defines a first volume and the second module has a second volume, the first volume being at least equal to the second volume.

9. The manipulator arm as defined in claim 1, comprising a third module coupled to the second module and configured to rotate relative to the second module, and wherein the second module has a second compartment defined therein between two spaced-apart longitudinal second arm elements, the second arm elements defining a boundary of the second compartment, the third module configured to be inserted in the second compartment.

10. The manipulator arm as defined in claim 1, wherein at least one of the first arm elements includes a first motorized module.

11. The manipulator arm as defined in claim 1, wherein at least one of the second arm elements includes a motorized module.

12. The manipulator arm as defined in claim 1, wherein the first pair of interconnected wheels are mounted in a coplanar relationship within a housing, and the first and second wheels drivingly connected via an elongated member movable in the housing, and
wherein the first module further comprises:
- a driver mounted to the housing between the first and second wheels, the driver having a rotatable pin extending along a first longitudinal axis, the rotatable pin rotating about the first longitudinal axis;
- a leadscrew mounted to the housing between the first and second wheels, the leadscrew extending along a second longitudinal axis, the leadscrew rotating about the second longitudinal axis;
- a transmission drivingly connecting the driver to the leadscrew; and
- a connector coupled to the leadscrew and configured to move longitudinally along the second longitudinal axis in response to a rotation of the leadscrew, the connector being attached to the elongated member.

13. A manipulator arm for a modular robotic structure comprising:
a base module having a first shaft portion extending from a first end of the base and a second shaft portion extending from a second end of the base, the first and second shaft portions extending in opposite directions along a first rotation axis;
a first module coupled to the base module and configured to rotate relative to the base module about the first rotation axis, the first module including a first pair of interconnected wheels and a second pair of interconnected wheels, the first pair of interconnected wheels having a first wheel fixedly connected with the first shaft portion and a second wheel, the second pair of interconnected wheels having a third wheel rotatably mounted on the second shaft portion and a fourth wheel; and
a second module coupled to the first module and configured to rotate relative to the first module, the second module being drivingly engaged with the fourth wheel of the first module;
wherein the first pair of interconnected wheels are mounted in a coplanar relationship within a housing, and the first and second wheels drivingly connected via an elongated member movable in the housing, and
wherein the first module further comprises:
- a driver mounted to the housing between the first and second wheels, the driver having a rotatable pin extending along a first longitudinal axis, the rotatable pin rotating about the first longitudinal axis;
- a leadscrew mounted to the housing between the first and second wheels, the leadscrew extending along a second longitudinal axis, the leadscrew rotating about the second longitudinal axis;
- a transmission drivingly connecting the driver to the leadscrew; and
- a connector coupled to the leadscrew and configured to move longitudinally along the second longitudinal axis in response to a rotation of the leadscrew, the connector being attached to the elongated member.

14. A manipulator arm for a modular robotic structure comprising:
a base module having a first shaft portion extending from a first end of the base and a second shaft portion extending from a second end of the base, the first and second shaft portions extending in opposite directions along a first rotation axis;
a first module coupled to the base module and configured to rotate relative to the base module about the first rotation axis, the first module including a first pair of interconnected wheels and a second pair of interconnected wheels, the first pair of interconnected wheels having a first wheel fixedly connected with the first shaft portion and a second wheel, the second pair of interconnected wheels having a third wheel rotatably mounted on the second shaft portion and a fourth wheel; and
a second module coupled to the first module and configured to rotate relative to the first module, the second module being drivingly engaged with the fourth wheel of the first module;
wherein the first module includes a first motorized sub-module, and the first wheel of the first pair of interconnected wheels corresponding to a first wheel of the first motorized sub-module, the second wheel of the first pair of interconnected wheels corresponding to a second wheel of the first motorized sub-module;
wherein the first module includes a second motorized sub-module, and the third wheel of the second pair of interconnected wheels corresponding to a first wheel of the second motorized sub-module, the fourth wheel of the second pair of interconnected wheels corresponding to a second wheel of the second motorized sub-module; and
wherein the base module is sandwiched between the first and second motorized sub-modules, each of the first and second motorized modules including:
a driver;

a leadscrew;

a transmission drivingly connecting the driver to the leadscrew; and a connector coupled to the leadscrew and movable longitudinally along the leadscrew in response to a rotation of the leadscrew.

15. A manipulator arm for a modular robotic structure comprising:

a base module having a first shaft portion extending from a first end of the base and a second shaft portion extending from a second end of the base, the first and second shaft portions extending in opposite directions along a first rotation axis;

a first module coupled to the base module and configured to rotate relative to the base module about the first rotation axis, the first module including a first pair of interconnected wheels and a second pair of interconnected wheels, the first pair of interconnected wheels having a first wheel fixedly connected with the first shaft portion and a second wheel, the second pair of interconnected wheels having a third wheel rotatably mounted on the second shaft portion and a fourth wheel; and a second module coupled to the first module and configured to rotate relative to the first module, the second module being drivingly engaged with the fourth wheel of the first module;

wherein the first module includes a first motorized sub-module, and the first wheel of the first pair of interconnected wheels corresponding to a first wheel of the first motorized sub-module, the second wheel of the first pair of interconnected wheels corresponding to a second wheel of the first motorized sub-module;

wherein the first module includes a second motorized sub-module, and the third wheel of the second pair of interconnected wheels corresponding to a first wheel of the second motorized sub-module, the fourth wheel of the second pair of interconnected wheels corresponding to a second wheel of the second motorized sub-module; and wherein the second module includes a third motorized sub-module and a fourth non-motorized sub-module, the third motorized sub-module drivingly connected to the first motorized sub-module of the first module, the fourth non-motorized sub-module drivingly connected to the second motorized sub-module of the first module.

* * * * *